United States Patent Office 3,555,401
Patented Jan. 12, 1971

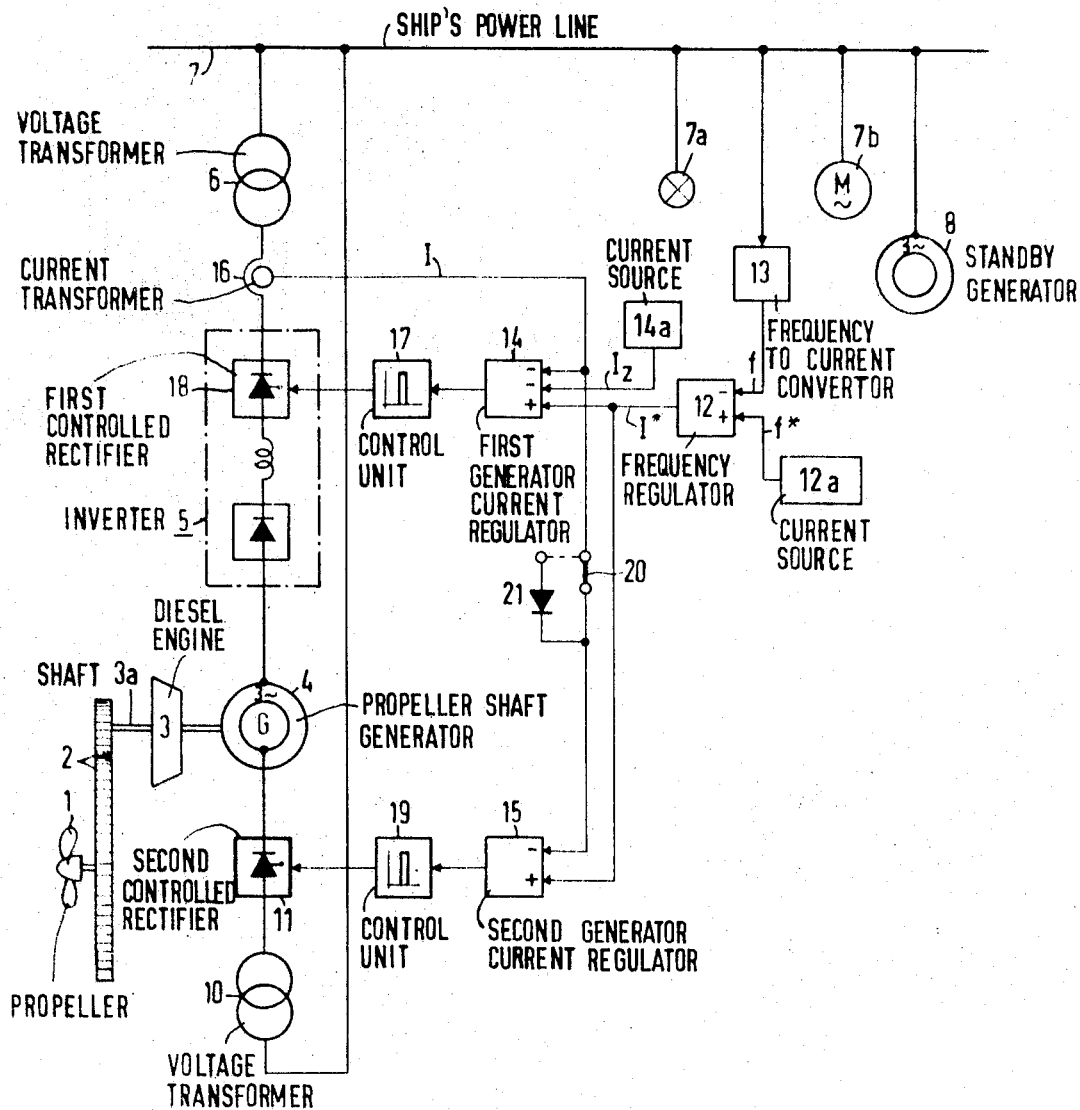

3,555,401
CIRCUIT ARRANGEMENT FOR REGULATING THE FREQUENCY OF ELECTRICAL POWER LINES ABOARD A SHIP
Karl-Heinz Bayer and Hermann Waldmann, Erlangen, Germany, assignors to Siemens Aktiengesellschaft, a corporation of Germany
Filed Apr. 11, 1969, Ser. No. 815,407
Claims priority, application Germany, Apr. 13, 1968, 1,763,167
Int. Cl. H02p 9/30
U.S. Cl. 322—32                    6 Claims

ABSTRACT OF THE DISCLOSURE

A first generator current regulator is connected to the controlled rectifier of an inverter connected between a synchronous generator mechanically coupled to the propeller shaft of a ship and the electrical power lines aboard the ship in the output circuit of the generator. A second generator current regulator is connected to a second controlled rectifier connected between the electrical power lines and the generator in the excitation circuit of the generator. The actual frequency of the power lines and a reference frequency are utilized to derive a reference current which is supplied to the first and second generator current regulators. One of the actual current in the power lines and the reference current of the first generator current regulator is varied relative to those of the second generator current regulator thereby compensating for speed variations of the propeller shaft.

DESCRIPTION OF THE INVENTION

The present invention relates to a frequency regulating circuit arrangement. More particularly, the invention relates to a circuit arrangement for regulating the frequency of electrical power lines aboard a ship.

Electrical generators are customarily mechanically applied to the propeller shaft of a ship to provide an economical source of current for the electrical power lines aboard the ship. The generators are synchronous generators and produce an output which is that required for the power lines. In order to maintain the voltage aboard ship, standby machines or generators are also provided. The frequency of the generator coupled to the propeller shaft varies or fluctuates in accordance with the rotary speed of said propeller shaft. This requires a frequency conversion prior to the supply of the output power of the generator to the electrical power lines. The conversion may be accomplished by a converter comprising an inverter and a rectifier.

An object of a regulating system for a ship-board electrical power system is to maintain the standby power required for the inverter as low as possible. Such standby power is provided by the standby generator aboard ship, which generator maintains the voltage of the electrical power lines. The maintenance of the standby power as low as possible requires a maximum control of the inverter up to its 150° adjustment or firing angle. Furthermore, it is necessary that the electrical power lines aboard ship will still be supplied with electrical power although the output voltage of the generator coupled to the propeller shaft is decreased. Such a decrease in generator output voltage may be caused by unavoidable and unforeseen reductions in rotary speed of the propeller shaft. In order to maintain the supply of electrical power to the electrical power lines, the maximum inverter control would have to be appropriately lessened.

The principal object of the present invention is to provide a new and improved circuit arrangement for regulating the frequency of electrical power lines aboard a ship.

An object of the present invention is to provide a circuit arrangement for regulating the frequency of electrical power lines aboard a ship to compensate for disturbances affecting the speed of the propeller shaft and therefore the frequency of the generator coupled to said propeller shaft.

An object of the present invention is to provide a circuit arrangement for regulating the frequency of electrical power lines aboard a ship at an optimum under normal conditions and to compensate for disturbances by maintaining electrical power in said electrical power lines during such disturbances.

An object of the present invention is to provide a circuit arrangement for regulating the frequency of electrical power lines aboard a ship with efficiency, effectiveness and reliability.

In accordance with the present invention, a circuit arrangement for regulating the frequency of electrical power lines aboard a ship functions aboard a ship having a propeller drive, a propeller shaft driven by the propeller drive, a propeller affixed to the propeller shaft and a synchronous generator mechanically coupled to the propeller shaft. The generator has an excitation circuit and an output circuit electrically coupled to the electrical power lines. In accordance with the present invention, the circuit arrangement comprises an inverter connected between the generator and the electrical power lines in the output circuit of the generator. The inverter comprises a first controlled rectifier. A second controlled rectifier is connected between the electrical power lines and the generator in the excitation circuit of the generator. A first generator current regulator is connected to the first controlled rectifier for controlling the conductivity condition of the first controlled rectifier. A second generator current regulator is connected to the second controlled rectifier for controlling the conductivity condition of the second controlled rectifier. A frequency regulator is electrically coupled between the electrical power lines and each of the first and second generator current regulators in common. An actual frequency circuit is connected between the electrical power lines and the frequency regulator for supplying to the frequency regulator an electrical signal corresponding in magnitude to the actual frequency of the electrical power lines. A reference frequency circuit is connected to the frequency regulator for supplying to the frequency regulator an electrical signal corresponding in magnitude to a reference frequency whereby the frequency regulator supplies to the first and second generator current regulators a reference current. An actual current circuit is electrically coupled between the output circuit of the generator and each of the first and second generator current regulators in common whereby one of the actual and reference currents of the first generator current regulator is varied relative to those of the second generator current regulator thereby compensating for speed variations of the propeller shaft.

The reference current supplied to the first generator current regulator is decreased in magnitude relative to the reference current supplied to the second generator current regulator. The actual current supplied to the first generator current regulator is increased in magnitude relative to the actual current supplied to the second generator current regulator. Thus, of the two first and second generator current regulators, both of which are controlled by the frequency regulator, only one is always active in supporting or regulating the frequency. During normal operation, this is accomplished by the second generator current regulator associated with by the excitation circuit of the generator. Such generator current regulator is automatically relieved by the first generator current regulator, which is associated with the output circuit of the generator, when there is a disruption affecting the propeller shaft.

The first and second generator current regulators have integral characteristics. This insures that the generator current is supplied directly to each of the first and second standstill, even when there is a small difference between the actual current and the reference current.

The reference current or actual current may be provided, in a simple manner, by an additional current. This may be accomplished by a current source connected to one of the first and second generator current regulators. The current source supplies an additional current to the one of the first and second generator current regulators. In another embodiment, this may be realized by omitting the special or additional current source. In such an embodiment, one of the reference current and the actual current is supplied directly to each of the first and second generator current regulators and the other of the reference current and the actual current is selectively supplied to one of the first and second generator current regulators via a threshold device. The reference current and the actual current of both generator current regulators then differ from each other by the threshold value of the threshold diode.

In order that the present invention may be readily carried into effect, it will now be described with reference to the accompanying drawing, wherein the single figure is a block diagram of an embodiment of the circuit arrangement of the present invention for regulating the frequency of the electrical power lines aboard a ship.

In the figure, a propeller 1 of a ship is mechanically coupled, via a drive such as, for example, a suitable gear coupling arrangement, to a Diesel engine 3. The Diesel engine 3 drives the propeller 1 via a propeller shaft 3a and the drive 2. The Diesel engine 3 also drives a propeller shaft generator 4 which is mechanically coupled to the propeller shaft 3a. The propeller shaft generator 4 is a synchronous generator which supplies its output to a ship's power line 7 via an inverter 5 and a voltage transformer 6. The inverter 5 comprises a first controlled rectifier 18. The ship's power line 7 provides the electrical power for the electrical system of the ship. The various electrical loads aboard ship, powered by the ship's power line, are represented symbolically by a lamp 7a and a motor 7b.

A standby generator 8 is provided to maintain the voltage of the ship's power line 7. The propeller shaft generator 4 is excited by the ship's power line 7 via a voltage transformer 10 and a second controlled rectifier 11 connected in the excitation circuit of said generator.

A frequency regulator 12 maintains the frequency of the electrical power in the power line 7. A constant reference or datum current $f^*$, representative for the desired value of the frequency is supplied to an input of the frequency regulator 12 by a suitable direct-current source 12a, for instance a battery. An actual or pilot current $f$, which corresponds to the frequency of the power line 7, is supplied to the other input of the frequency regulator 12 by a frequency-to-current converter 13, the input of 12 which is connected to the power line 7. This converter comprises a pulse shaper which converts the frequency of its input voltage into a proportional direct current, as described in the periodical "Siemens Review" 1966, No. 3, pp. 150–151. A converter of this type is available as Siemens Aktiengesellschaft unit TS 721 V 3089b. The frequency regulator 12 produces an output signal which is the reference or datum current $I^*$.

The output reference current $I^*$ of the frequency regulator 12 is simultaneously supplied to an input of each of a first generator current regulator 14 and a second generator current regulator 15. The frequency regulator 12 thus controls the first and second generator current regulators 14 and 15 via the reference current $I^*$. An additional current $I_Z$ is supplied to a second input of the first generator current regulator 14 by a current source 14a, for instance a battery. The additional current $I_Z$ is supplied in a manner which decreases the magnitude of the actual current I.

The actual or pilot current I, corresponding to the current in the power line 7, is derived from the output of the propeller shaft generator 4 by a current transformer 16. The current transformer 16 is connected in series between the first controlled rectifier 18 and the voltage transformer 16. The current transformer 16 supplies the actual current I simultaneously to a third input of the first generator current regulator 14 and a second input of the second generator current regulator 15.

The output of the first generator current regulator 14 controls the firing angle or control angle of the first controlled rectifier via a control unit 17. The output of the second generator current regulator 15 controls the firing angle or control angle of the second controlled rectifier 11 via a control unit 19. These control units may comprise any suitable control unit such as, for example, Siemens Aktiengesellschaft unit teb 4b 22st 603–1.

The first and second generator current regulators 14 and 15 function in a manner whereby they cooperate with each other so that only one of them is active at any time. Each of the first and second generator current regulators 14 and 15 relieves the other automatically. In the normal range of rotary speeds of the propeller shaft 3a, which normal range depends to a considerable extent upon the rotary speed of the Diesel engine 3, the second generator current regulator 15 applies the excitation voltage of the propeller shaft generator 4 via the controlled rectifier 11, for a period until the magnitude of the reference current $I^*$, required by the frequency regulator 12 to maintain the reference frequency $f^*$, is reached by the actual current I.

During the aforedescribed operation, the additional current $I_Z$ provides the first generator current regulator 14 with a smaller magnitude of the total actual current I and simulates the same control deviation which would occur when the actual magnitude of the current I exceeds the magnitude of the reference current $I^*$. Since the first generator current regulator 14, as is usual with current regulators, attempts to reduce the control deviation, it has such an effect, via the control unit 17, upon the counter voltage of the first controlled rectifier 18, that said counter voltage is increased. The increase in counter voltage of the first controlled rectifier 18 decreases the current produced by the propeller shaft generator 4, which is the actual current I. This, in turn, causes an increase in the excitation voltage of the propeller shaft generator 4, and thus an increase in the voltage of said generator.

The aforedescribed operation continues until the first controlled rectifier 18 reaches its control limit of 150°. The first generator current regulator 14 is then made inoperative and the current supply via the first controlled rectifier 18 is at the minimum standby power. The usual and customary limiting measures are utilized to insure that the first controlled rectifier 18 never exceeds its control limit of 150°.

If the speed of rotation of the Diesel engine 3, and therefore the propeller shaft 3a, decreases, or if the rotary speed of said propeller shaft decreases for any reason, the voltage produced by the propeller shaft generator 4 decreases. When the first controlled rectifier 18 is fully controlled, the excitation current of the propeller shaft generator 4 is decreased. During the foregoing period the second generator current regulator 15 counteracts the decrease in the excitation current of the generator 4, until said second generator current regulator reaches its control limit. If this does not prevent a further decrease in the generator current, the actual current I reaches a magnitude which is the difference $I^* - I_Z$, which is the difference between the reference current and the additional current. When, due to the polarity of the control deviation, the first generator current regulator 14 is activated or returned to operation, the control of the first controlled rectifier 18 proceeds in the direction of operation of the inverter 5. This is accompanied by a decrease in the counter voltage of the first controlled rectifier 18. In this manner, a current which is required to maintain the frequency of the power line 7 is provided despite disturbances in the rotary speed of the propeller shaft 3a.

Instead of decreasing the reference current I* supplied to the first generator current regulator 14 relative to the reference current I* supplied to the second generator current regulator 15 by utilization of the additional current $I_z$, a threshold diode 21 may be utilized. The threshold diode 21 is connected between the first and second generator current regulators 14 and 15 and causes the decrease in magnitude of the reference current I* supplied to the first regulator relative to that supplied to the second regulator by an amount corresponding to the threshold voltage of said diode. A Zener diode may be utilized as the threshold diode 21. In such case, the Zener voltage determines the difference between the reference current magnitudes supplied to the first and second generator current regulators 14 and 15.

Analogous to the decrease in the magnitude of the reference current I* supplied to the first generator current regulator 14, the magnitude of the actual current I supplied to said regulator may be increased or the magnitude of the actual current I supplied to the second generator current regulator 15 may be decreased. The illustration of the figure is that of the decrease in the actual current I supplied to the second generator current regulator 15. To achieve this, the additional current source 14a is eliminated. A switch 20 is utilized and is positioned horizontally, as indicated by the broken lines, to connect the threshold diode 21 into the circuit. This results in a decrease of the magnitude of the actual current I supplied to the second generator current regulator 15. The same result is attained by the aforedescribed method of operation involving the utilization of the source of additional current 14a.

A current regulator with an integral characteristic, as utilized in the circuit arrangement of the present invention as each of the first and second generator current regulators 14 and 15, may comprise any suitable circuit such as, for example, that shown and described on pages 771 to 773 of a textbook entitled "Feedback Control Systems" by Gille, Pelegrin and Decauline, McGraw-Hill Book Company, Inc., 1959. A current regulator with an integral characteristic is also described in the German Standards entitled "Regelungstechnik" DIN 19226, Siemens Schuckertwerke Aktiengesellschaft, August 1955, page 11.

Each of the frequency indicator 13, source of additional current 14a, source of reference frequency 12a, frequency regulator, control unit 17 and control unit 19 comprises a known circuit.

While the invention has been described by means of a specific example and in a specific embodiment, we do not wish to be limited thereto, for obvious modifications will occur to those skilled in the art without departing from the spirit and scope of the invention.

We claim:
1. A circuit arrangement for regulating the frequency of electrical power lines aboard a ship having propeller driving means, a propeller shaft driven by said propeller driving means, a propeller affixed to said propeller shaft and a synchronous generator mechanically coupled to said propeller shaft, said generator having an excitation circuit and an output circuit electrically coupled to said electrical power lines, said circuit arrangement comprising
inverter means connected between said generator and said electrical power lines in the output circuit of said generator, said inverter means comprising first controlled rectifier means;
second controlled rectifier means connected between said electrical power lines and said generator in the excitation circuit of said generator;
first generator current regulating means connected to said first controlled rectifier means for controlling the conductivity condition of said first controlled rectifier means;
second generator current regulating means connected to said second controlled rectifier means for controlling the conductivity condition of said second controlled rectifier means;
frequency regulating means electrically coupled between said electrical power lines and each of said first and second generator current regulating means in common;
actual frequency means connected between said electrical power lines and said frequency regulating means for supplying to said frequency regulating means an electrical signal corresponding in magnitude to the actual frequency of said electrical power lines;
reference frequency means connected to said frequency regulating means for supplying to said frequency regulating means an electrical signal corresponding in magnitude to a reference frequency whereby said frequency regulating means supplies to said first and second generator current regulating means a reference current; and
actual current means electrically coupled between the output circuit of said generator and each of said first and second generator current regulating means in common whereby one of said actual and reference currents of said first generator current regulating means is varied relative to those of said second generator current regulating means thereby compensating for speed variations of said propeller shaft.

2. A circuit arrangement as claimed in claim 1, wherein the first and second generator current regulating means have integral characteristics.

3. A circuit arrangement as claimed in claim 1, further comprising means connected to one of said first and second generator current regulating means for supplying an additional current to said one of said first and second generator current regulating means.

4. A circuit arrangement as claimed in claim 1, further comprising a threshold diode, and wherein one of the reference current and the actual current is supplied directly to each of said first and second genrator current regulating means and the other of said reference current and said actual current is selectively supplied to one of said first and second generator current regulating means via said threshold diode.

5. A circuit arrangement as claimed in claim 1, wherein the reference current supplied to said first generator current regulating means is decreased in magnitude relative to the reference current supplied to said second generator current regulating means.

6. A circuit arrangement as claimed in claim 1, wherein the actual current supplied to said first generator current regulating means is increased in magnitude relative to the actual current supplied to said second generator current regulating means.

References Cited

UNITED STATES PATENTS 3,121,836  2/1964  Rosenberry _____ 322—32X
3,369,170  2/1968  Custer _____ 322—73X ORIS L. RADER, Primary Examiner H. HUBERFELD, Assistant Examiner U.S. Cl. X.R.

322—73, 94